March 2, 1937.  R. J. OLANDER  2,072,274

FRICTION SHOCK ABSORBING MECHANISM

Filed June 12, 1936  2 Sheets-Sheet 2

Inventor
Roland J. Olander
By Henry Fuchs
Atty.

Patented Mar. 2, 1937

2,072,274

UNITED STATES PATENT OFFICE 2,072,274

FRICTION SHOCK ABSORBING MECHANISM

Roland J. Olander, Chicago, Ill., assignor to W. H. Miner, Inc., Chicago, Ill., a corporation of Delaware Application June 12, 1936, Serial No. 84,921

12 Claims. (Cl. 213—32)

This invention relates to improvements in friction shock absorbing mechanisms especially adapted for railway draft riggings.

One object of the invention is to provide a friction shock absorbing mechanism having high capacity and assured quick release.

Another object of the invention is to provide a friction shock absorbing mechanism comprising a friction casing and a spring resisted friction clutch having sliding frictional engagement with the interior surfaces of the walls of the casing, wherein the friction clutch comprises a wedge and cooperating friction shoes, certain of said shoes having keen angle wedging engagement with the wedge to produce high frictional capacity and the remainder of said shoes having blunt angle wedging engagement with the wedge to facilitate easy release when the actuating force is reduced, and wherein the releasing action of the clutch is positively effected by forcibly disengaging the wedge from the keen angle shoes by exerting an outward pressure thereon through the blunt angle shoes independently of the keen shoes.

Other objects of the invention will more clearly appear from the description and claims hereinafter following.

Figure 1:
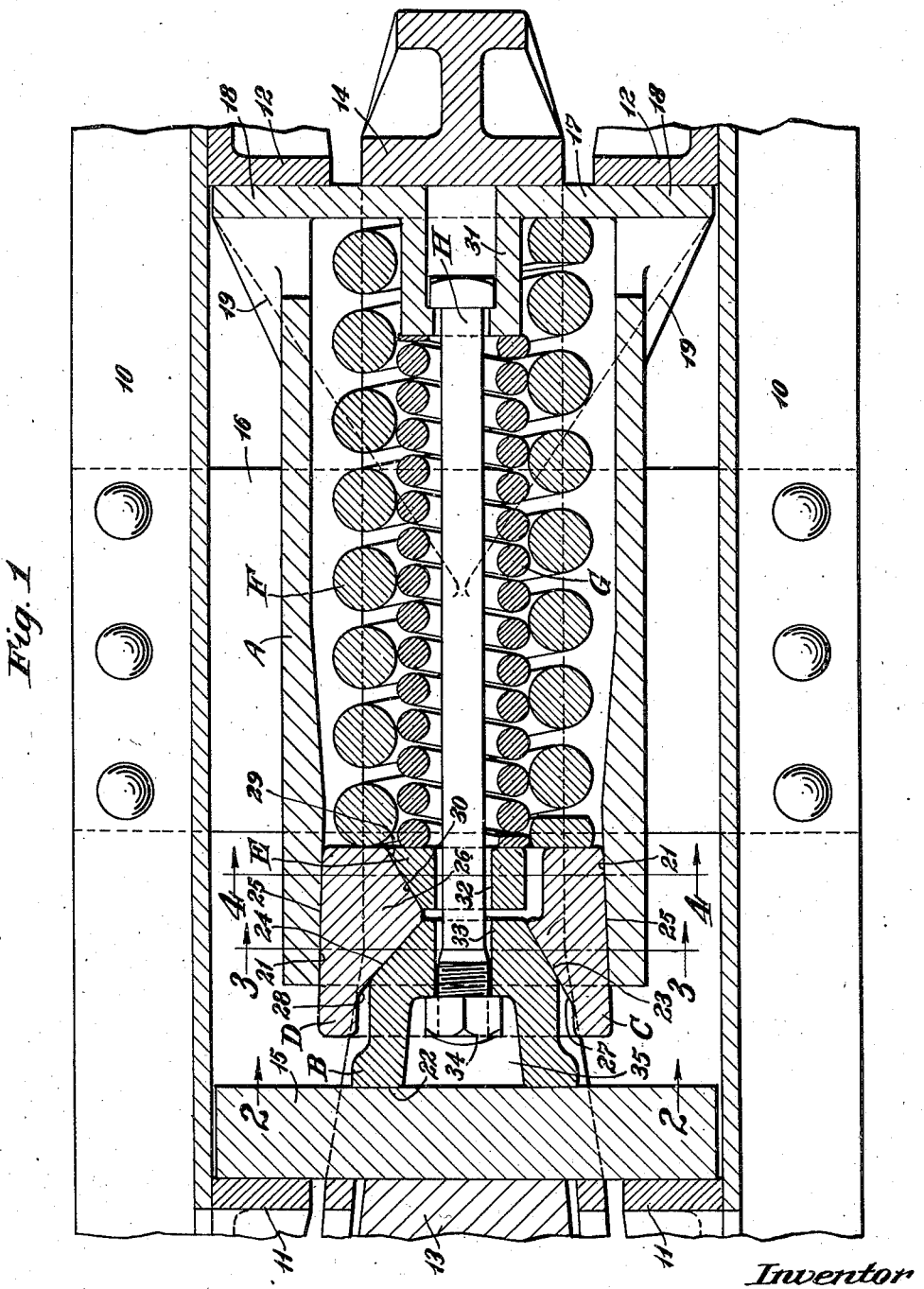
Figure 2:
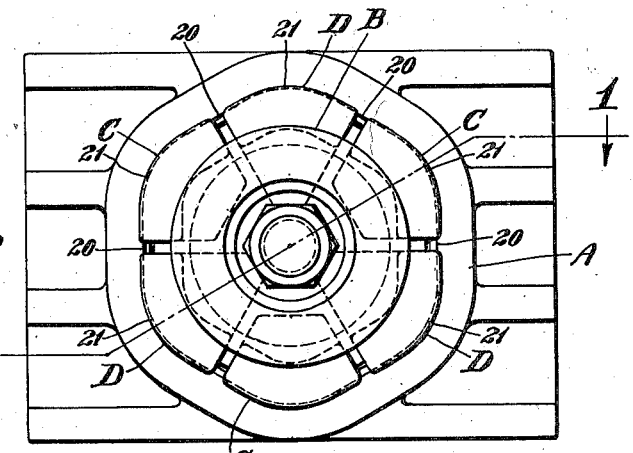
Figure 3:
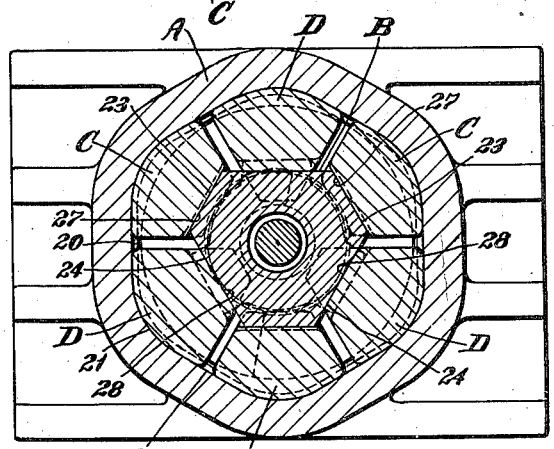
Figure 4:
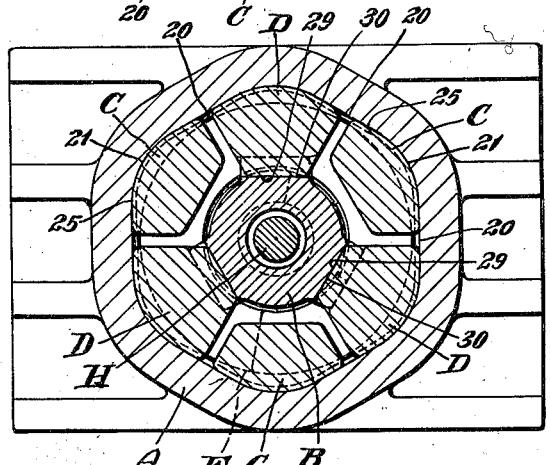

In the drawings forming a part of this specification, Figure 1 is a horizontal, longitudinal, sectional view through the underframe structure at one end of a railway car, illustrating my improved friction shock absorbing mechanism in connection therewith, the section through said friction shock absorbing mechanism corresponding substantially to the line 1—1 of Figure 2. Figure 2 is a front elevational view of the shock absorbing mechanism as indicated by the arrows 2—2 of Figure 1. Figures 3 and 4 are transverse, vertical, sectional views, corresponding respectively to the lines 3—3 and 4—4 of Figure 1.

In said drawings, 10—10 indicate channel-shaped center or draft sills of a railway car underframe having the usual front and rear stop lugs 11—11 and 12—12 secured to the inner sides thereof. The inner end portion of the shank of the standard coupler is indicated by 13 and a hooded yoke 14, of well-known type, is operatively connected to the coupler shank. My improved friction shock absorbing mechanism and a front main follower 15 are disposed within the yoke. The yoke 14 is slidingly supported on a saddle plate 16 secured to the bottom flanges of the draft sills 10—10.

My improved friction shock absorbing mechanism comprises broadly a friction casing A; a wedge block B; three friction shoes C—C—C having keen angle wedging engagement with the wedge block; three friction shoes D—D—D having relatively blunter angle wedging engagement with the wedge block; a spring follower E cooperating with the blunt angle shoes; spring resistance members F and G opposing inward movement of the shoes C—C—C and D—D—D, respectively; and a retainer bolt H.

The friction casing A, which is preferably in the form of a steel casting, is of substantially hexagonal cross section, open at the front end and having a transverse, vertical end wall 17 closing the rear end thereof. The wall 17 is extended laterally beyond the side walls of the casing, thereby providing flanges 18—18. The rear wall 17, together with the flanges 18—18 thereof, forms, in effect, a follower which is integral with the casing and cooperates with the rear stop lugs 12—12 in the manner of the usual rear follower. The flanges 18—18 are preferably reenforced by webs 19—19 which are integral with the side walls of the casing A and said flanges 18—18. At the forward end of the casing A, the walls thereof are thickened, as clearly shown in Figure 1, the thickened wall portions presenting six substantially flat, interior surfaces 20—20 which converge inwardly of the mechanism. The flat surfaces 20—20 merge with curved surfaces 21—21 which connect the adjacent flat surfaces. The surfaces 20, together with the surfaces 21, present a tapered friction shell section of substantially hexagonal cross section, presenting six interior friction surfaces of substantially V-shaped cross section, each V-shaped friction surface being formed by the adjacent end sections of two of the flat surfaces 20—20.

The wedge B is in the form of a block having a transverse front end face 22 bearing on the inner side of the front follower 15. The block B is in the form of a truncated pyramid having six inwardly converging flat wedge faces 23—23—23 and 24—24—24, arranged symmetrically about the axis of the mechanism, the faces 23 being alternated with the faces 24, as most clearly shown in Figures 1 and 3. The faces 23—23—23 are preferably disposed at a keener angle with respect to the longitudinal axis of the mechanism than the faces 24—24—24. The arrangement of the faces 23—23—23 and 24—24—24 is such that the faces 23 are inclined at substantially keen wedging angles and the faces 24 at substantially blunt releasing angles with respect to said longitudinal axis. The wedge block B is so disposed that the wedge faces thereof are respectively opposed to the apexes of the V-shaped friction surfaces of the casing A.

The six friction shoes C—C—C and D—D—D are all of similar design except as hereinafter pointed out. Each shoe has an outer friction surface 25 of substantially V-shaped cross section fitting one of the V-shaped friction surfaces of the casing A and correspondingly inclined thereto. On the inner side, each shoe is laterally enlarged as indicated at 26, said enlarged portion being provided with a wedge face cooperating with one of the wedge faces of the block B. The wedge faces of the shoes C—C—C are indicated by 27—27—27, while the wedge faces of the shoes D—D—D are indicated by 28—28—28. The shoes C—C—C are alternated with the shoes D—D—D, the wedge faces 27—27—27 of the shoes C—C—C engaging with and being correspondingly inclined to the wedge faces 23—23—23 of the block B and the wedge faces 28—28—28 of the shoes D—D—D being correspondingly inclined to and engaging with the wedge faces 24—24—24 of said block. In other words, the shoes C—C—C present wedge faces which have wedging engagement with the block at a substantially keen wedging angle and the shoes D—D—D present wedge faces which have engagement with the block on a substantially blunt releasing angle. At the inner end each shoe D is provided with a wedge face 29 also disposed at a relatively blunt angle with respect to the longitudinal axis of the mechanism.

The spring follower E is in the form of a block and is provided with three wedge faces 30—30—30 at the forward side thereof disposed symmetrically about the longitudinal axis of the mechanism and engaging respectively the wedge faces 29—29—29 of the three shoes D—D—D.

The spring resistance members F and G are disposed within the casing A. Each member is preferably in the form of a coil spring, the member G being lighter than the member F and disposed within the latter. The outer coil F is interposed between the rear end of the casing and the inner ends of the shoes C—C—C and has its front and rear ends bearing respectively directly on said shoes and the end wall 17. The coil F is held centered by a hollow boss 31 on the end wall 17 engaging within the rear end of said coil. The coil G is disposed between the rear end of the casing and the shoes D—D—D and has its front end bearing on the spring follower block E which is interposed between said coil and the friction shoes D—D—D. The rear end of the coil G bears directly on the hollow boss 31.

The bolt H, which holds the mechanism assembled, is headed at the rear end, said headed end having shouldered engagement with the boss 31 to anchor the bolt to the casing A. The shank of the bolt extends through the coil spring G and openings 32 and 33 in the spring follower block E and the wedge block B. The bolt H is anchored to the wedge block B by a nut 34 threaded on the outer end thereof and accommodated in a pocket 35 provided in the outer end portion of said block, the nut having shouldered engagement with the inner end wall of said pocket to limit outward movement of the wedge. In addition to holding the mechanism assembled, the bolt H serves to maintain the parts of uniform overall length and under initial compression.

The operation of my improved friction shock absorbing mechanism is as follows: Upon outward movement of the coupler in draft, the friction casing A is pulled outwardly therewith by means of the yoke 14 which is connected to the coupler. During this action, the wedge block B is held stationary by engagement with the front follower, the latter being held against outward movement by the front stop lugs 11—11. During inward movement of the coupler in buff, the front follower 15 is forced rearwardly, carrying the wedge block B therewith, while the casing A is held stationary by the rear stop lugs 12—12. The wedge block is thus forced inwardly of the casing during compression of the mechanism in both draft and buffing actions of the rigging. During inward movement of the wedge block, wedging action is set up between the same and the friction shoes C—C—C and D—D—D and the shoes are carried inwardly or rearwardly of the casing against the resistance of the springs F and G. The shoes are spread apart by this wedging action of the block B, thereby forcing the former into tight frictional contact with the friction surfaces of the casing. Inasmuch as the spring F opposes movement of the shoes C—C—C only and the spring G opposes movement of the shoes D—D—D independently of the spring F, all of the shoes are constantly maintained in tight frictional contact with the friction surfaces of the casing A throughout the compression stroke of the mechanism, thereby assuring efficient operation of the device. As the clutch or friction unit comprising the wedge B and the shoes C—C—C and D—D—D is moved inwardly along the friction surfaces of the casing A, the clutch or friction unit is contracted circumferentially due to the converging arrangement of the friction surfaces of the casing, thereby causing the unit to be elongated and effecting additional compression of the springs F and G, the wedge faces of the shoes slipping on the wedge faces of the block B. During this contraction of the friction clutch or unit, the spring follower block E is squeezed outwardly with respect to the shoes D—D—D, thereby effecting further compression of the spring G. Compression of the mechanism is limited by engagement of the front follower 15 with the outer end of the casing A, whereupon the casing serves as a solid column to transmit the load and prevent undue compression of the springs F and G.

In release of the mechanism, when the actuating force is reduced, the spring resistance members F and G force the friction clutch or unit, comprising the shoes C—C—C and D—D—D and the wedge block B, outwardly of the casing, the releasing action being initiated by the shoes D—D—D which, due to their blunt angle engagement with the wedge block B, are readily releasable. As the releasing action is initiated, the spring G, which acts on the shoes D—D—D alone, through the medium of the spring follower, forces these shoes outwardly of the casing, carrying the wedge block therewith and freeing the latter from the shoes C—C—C, thus effecting complete release of the friction unit. Outward movement of the wedge block B in full release is limited by the retainer bolt H, the wedge in turn limiting outward movement of the shoes C—C—C and D—D—D.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a column member having friction surfaces; of a wedge member having wedge faces, certain of said faces being disposed at keen wedging angles with respect to the longitudinal axis of the mechanism and others of said faces being disposed at relatively blunter releasing angles with respect to said axis; friction shoes having sliding frictional engagement with said column member, certain of said shoes having wedge faces disposed at a keen angle with respect to said longitudinal axis engaging the keen faces of the wedge and others of said shoes having wedge faces disposed at a blunter angle with respect to said longitudinal axis, engaging the blunt faces of the wedge; spring means opposing movement of said keen angled shoes; and additional spring resistance means opposing movement of said blunt angle shoes only.

2. In a friction shock absorbing mechanism, the combination with a column member having longitudinally disposed friction surfaces; of a friction clutch unit having sliding frictional engagement with said surfaces, said unit including a wedge member and cooperating shoes, said wedge member having wedging engagement with certain of said shoes at an angle which is blunter with respect to the longitudinal axis of the mechanism than the angle of engagement between said wedge and the remaining shoes; spring means yieldingly opposing movement of said last named shoes; and additional spring means opposing movement of the shoes having blunt angle engagement with said wedge member.

3. In a friction shock absorbing mechanism, the combination with a column member having longitudinally disposed friction surfaces inclined to the longitudinal axis of the mechanism; of a friction clutch unit having sliding frictional engagement lengthwise of said surfaces, said unit including a wedge member, friction shoes, and a spring follower block, said wedge having keen angle wedging engagement with certain of said shoes, and relatively blunter angle wedging engagement with the remaining shoes, and said spring follower having wedging engagement with said remaining shoes only; a spring opposing movement of the shoes which have keen wedging engagement with the wedge member; and an additional spring opposing movement of said spring follower and the shoes engaged thereby.

4. In a friction shock absorbing mechanism, the combination with a column member having longitudinally disposed friction surfaces inclined to the longitudinal axis of the mechanism; of a plurality of friction shoes having sliding frictional engagement with said friction surfaces; a wedge member, said wedge member and certain of said shoes having engaging wedge faces disposed at a relatively keen angle with respect to the longitudinal axis of the mechanism, said wedge and the remaining shoes having engaging faces disposed at a relatively blunter angle with respect to said axis; a spring follower having wedging engagement with said remaining shoes only, the angles of wedging engagement between said spring follower and shoes being relatively blunter with respect to said longitudinal axis than said keen angle wedge faces of said wedge member; a spring yieldingly opposing movement of said spring follower; and a spring opposing movement of the shoes having keen angle wedging engagement with the wedge member.

5. In a friction shock absorbing mechanism, the combination with a friction casing having interior friction surfaces extending lengthwise thereof; of a plurality of friction shoes slidable lengthwise on said surfaces; a wedge block having wedging engagement with said shoes, the wedging engagement between said wedge and certain of said shoes being at an angle which is blunter than the angle of engagement between said wedge and the remaining shoes; spring means opposing inward movement of said remaining shoes; and additional spring means yieldingly opposing inward movement of said shoes which have engagement with the wedge at said blunter angle.

6. In a friction shock absorbing mechanism, the combination with a friction casing having interior, inwardly converging, friction surfaces; of two sets of shoes having sliding frictional engagement with the friction surfaces of the casing, the shoes of one of said sets having wedge faces disposed at a relatively keen wedging angle with respect to the longitudinal axis of the mechanism, and the shoes of the other set having wedge faces disposed at a relatively blunter releasing angle with respect to said axis; a wedge block having wedge faces respectively engaging the wedge faces of the shoes; a spring follower having wedging engagement with said shoes only which have the blunt wedge faces; a spring yieldingly resisting movement of said spring follower; and an additional spring yieldingly resisting movement of said shoes having the keen wedge faces.

7. In a friction shock absorbing mechanism, the combination with a friction casing having inwardly converging, interior friction surfaces; of a friction clutch cooperating with the casing, said clutch including a wedge block, two sets of friction shoes, and a spring follower, the shoes of one of said sets having wedging engagement with the block at relatively keen angles with respect to the longitudinal axis of the mechanism, the shoes of the other set having engagement with said block at relatively blunter releasing angles with respect to said axis, and said spring follower having wedging engagement with said shoes only which have blunt angle engagement with the wedge, the engagement between said shoes and spring follower being at a relatively blunt releasing angle with respect to said axis; a spring yieldingly opposing movement of said keen wedge shoes inwardly of the casing; and a spring yieldingly opposing inward movement of said spring follower.

8. In a friction shock absorbing mechanism, the combination with a friction casing; of a wedge block; a plurality of friction shoes arranged about said block; alternate shoes having wedging engagement with the block at relatively keen angles with respect to the longitudinal axis of the mechanism, the remaining shoes having engagement with said block at relatively blunter releasing angles with respect to said axis; a spring opposing movement of said keen angle shoes inwardly of the casing; and an additional spring yieldingly opposing inward movement of said blunt angle shoes only.

9. In a friction shock absorbing mechanism, the combination with a friction casing; of two sets of friction shoes having frictional sliding engagement with the casing, the shoes of one set being alternated with the shoes of the other set; a wedge block having wedging engagement with the shoes of both sets, the wedging engagement between said wedge and the shoes of one of said sets being at a keener angle with respect to the longitudinal axis of the mechanism than the angle of engagement between said wedge and the shoes of the other set; a spring yieldingly opposing movement of one of said sets of shoes only, inwardly of the casing; and an additional spring resistance yieldingly opposing movement of the other of said sets only, inwardly of said casing.

10. In a friction shock absorbing mechanism, the combination with a friction casing; of six friction shoes having sliding frictional engagement with the casing, said shoes comprising two sets of three shoes each, the shoes of one set being alternated with the shoes of the other set; a spring yieldingly resisting movement of the shoes of one set only; a second spring yieldingly resisting movement of the shoes of the other set only; and a wedge block having wedging engagement with all of said shoes, the angles of wedging engagement of said wedge and one of said sets of shoes being keener than the angle of engagement thereof with the shoes of the other set.

11. In a friction shock absorbing mechanism, the combination with a friction casing having longitudinally disposed, inwardly converging, interior friction surfaces; of six friction shoes disposed symmetrically about the axis of the mechanism, said shoes comprising two sets of three shoes each, the shoes of one of said sets being alternated with the shoes of the other set; a wedge block having wedging engagement with all of said shoes; a spring follower having wedging engagement with the shoes of one of said sets only, the angles of engagement between said spring follower and the set of shoes engaged thereby and between said last named shoes and the wedge being blunter with respect to the longitudinal axis of the mechanism than the angles of engagement between said wedge and the other set of shoes; spring resistance means yieldingly opposing inward movement of the spring follower; and additional spring resistance means opposing inward movement of said last named shoes only.

12. In a friction shock absorbing mechanism, the combination with a friction casing having longitudinally disposed, inwardly converging, interior friction surfaces; of six friction shoes within the casing disposed symmetrically about the axis thereof, said shoes comprising two sets of three shoes each, the shoes of one set being alternated with the shoes of the other set; a spring yieldingly resisting inward movement of the shoes of one set; a spring follower in wedging engagement with the shoes of the other set; a second spring yieldingly opposing inward movement of said spring follower; and a wedge block having wedging engagement with the shoes of both sets, the angle of wedging engagement between said spring follower and the shoes of the set engaged thereby and between said last named shoes and said wedge block being at a blunter angle with respect to the longitudinal axis of the mechanism than the angle of wedging engagement between said block and the shoes of the other set.

ROLAND J. OLANDER.